United States Patent
Kamleiter et al.

(10) Patent No.: US 8,393,479 B2
(45) Date of Patent: Mar. 12, 2013

(54) METHOD FOR THE PRODUCTION OF TUBULAR MEMBRANES

(75) Inventors: Michael Kamleiter, Stuttgart (DE); Wilhelm N. Gudernatsch, Stuttgart (DE); Edith Gudernatsch, legal representative, Stuttgart (DE)

(73) Assignee: X-Flow B.V., Enschede (NL)

( * ) Notice: Subject to any disclaimer, the term of this patent is extended or adjusted under 35 U.S.C. 154(b) by 1722 days.

(21) Appl. No.: 10/582,349

(22) PCT Filed: Sep. 17, 2004
(Under 37 CFR 1.47)

(86) PCT No.: PCT/EP2004/010434
§ 371 (c)(1),
(2), (4) Date: Jan. 8, 2008

(87) PCT Pub. No.: WO2005/061081
PCT Pub. Date: Jul. 7, 2005

(65) Prior Publication Data
US 2008/0251445 A1    Oct. 16, 2008

(30) Foreign Application Priority Data
Dec. 11, 2003   (DE) .................................. 103 58 477

(51) Int. Cl.
*B01D 63/02*    (2006.01)
(52) U.S. Cl. .............. 210/500.23; 210/490; 210/497.01; 210/482; 210/505
(58) Field of Classification Search ........................ None
See application file for complete search history.

(56) References Cited

U.S. PATENT DOCUMENTS

| | | | |
|---|---|---|---|
| 4,740,434 A | | 4/1988 | Hirota et al. |
| 5,034,129 A | * | 7/1991 | Ten Hove ....................... 210/490 |
| 5,071,700 A | | 12/1991 | Sugino et al. |
| 5,134,030 A | | 7/1992 | Ueda et al. |
| 5,342,434 A | | 8/1994 | Wu |
| 5,359,735 A | * | 11/1994 | Stockwell ....................... 2/243.1 |
| 5,595,659 A | | 1/1997 | Huang et al. |
| 6,454,942 B1 | * | 9/2002 | Shintani et al. .......... 210/321.74 |
| 7,695,026 B2 | | 4/2010 | Okamoto et al. |
| 2002/0046970 A1 | * | 4/2002 | Murase et al. ................. 210/483 |
| 2003/0098275 A1 | * | 5/2003 | Mahendran et al. .......... 210/490 |

FOREIGN PATENT DOCUMENTS

| | | |
|---|---|---|
| DE | 228 452 | 10/1985 |
| EP | 1 059 114 | 12/2000 |
| WO | WO 03/076055 | 9/2003 |

* cited by examiner

*Primary Examiner* — Krishnan S Menon
(74) *Attorney, Agent, or Firm* — Roylance, Abrams, Berdo & Goodman L.L.P.

(57) ABSTRACT

A method for producing tubular membranes creates a very inexpensive production method, while obtaining very high output rates for tubular membranes. A tubular member (10) is formed from several threads (12) in such a way that at least some of the threads (12) are tightly tied together along web-type connecting lines (14) that are composed of longitudinal threads. At least some of the threads (12) form a transversal connection (16) between adjacent longitudinal threads (14) in between the web-type connecting lines (14). A predefined membrane material (18) is applied to the tubular member (10).

24 Claims, 1 Drawing Sheet

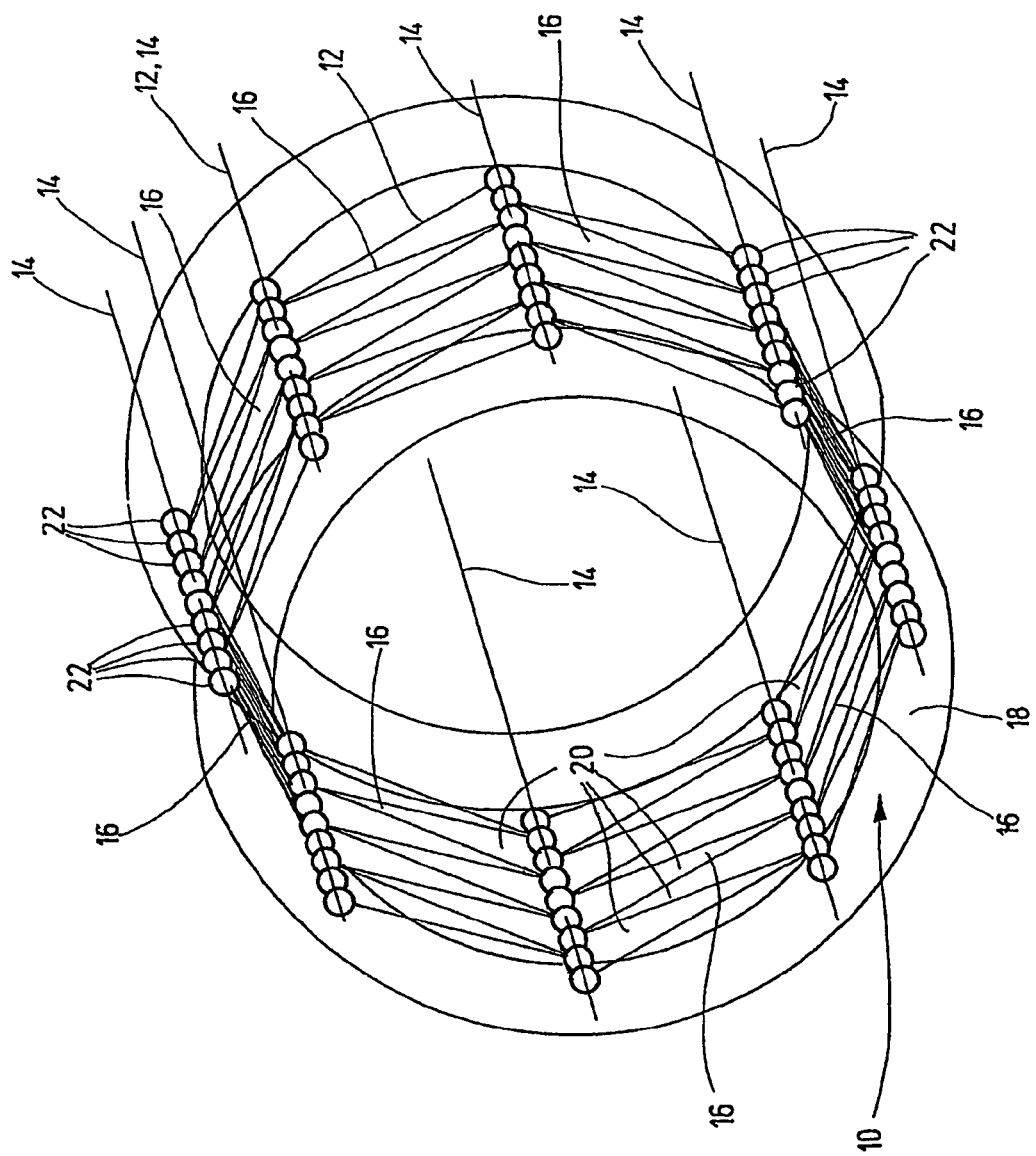

METHOD FOR THE PRODUCTION OF TUBULAR MEMBRANES

FIELD OF THE INVENTION

The present invention relates to a method for the production of tubular membranes.

BACKGROUND OF THE INVENTION

EP 0 349 914 B1 discloses a method for the production of tubular nonwoven fabric articles from a strip of a thermoplastic nonwoven support. To form a nonwoven tube, the support is wound up in a spiral form in such a way that the longitudinal edges of the strip overlap along a joining seam. At least in the wound area of the nonwoven tube, this joining seam is formed by thermally welding the longitudinal edges to one another. Winding the strip up into the spiral nonwoven article results in the creation of a hollow rod which, at its free end, has an outlet opening through which a coating solution can be applied to the inside wall of the wound nonwoven tube. By subsequent contact with a coagulation solution, a tubular membrane is obtained.

Tubular membranes of this kind are suitable in particular for ultrafiltration and nanofiltration. These membranes form microporous filter media whose pores are so small that they form a barrier not only to particles of all kinds and shapes, such as pollutants, heavy metals, etc., but also to all microorganisms, for example, in the form of bacteria, parasites and viruses. The active layer of the membranes is also referred to in the technical field as the semipermeable layer. A disadvantage of tubular membranes produced in this way is that, under the pressure exerted by the liquid that is to be filtered, they often tear in the area of the thermal connecting seams, and thus, fail to function properly. To counteract this failure, the German laid-open specification 2 255 989 proposes that the outside periphery of the semipermeable membrane tubes, which are also thin and fragile, should be enclosed by a reinforcement in the form of a braided fiber structure to counter the high hydraulic internal pressure. However, the known production method is complicated, and therefore, expensive. The reinforcement in the form of the braided fiber structure that bears directly on the semipermeable membrane has a disadvantageous effect on the rate of flow through the tubular membrane and on the membrane's filtration properties.

To avoid the problems that arise when the pressure of a liquid causes undesired separation of the thermally produced connecting seams in a spirally wound tubular membrane made from a strip-shaped article, DE 199 09 930 A1 proposes a tubular composite structure composed of a braid of thread bundles and/or wires, preferably in the form of an electron-conducting material and, arranged over this braid, a layer of an ion-conducting material as fuel cell element. In this known solution, aimed among other things at producing what is known as a PEM fuel cell, it is proposed that the tubular inner electrode composed of carbon fibers and/or metal wires be produced by a braiding machine. This tubular braid is centered on a mandrel along which it extends as far as an applicator nozzle for the catalyst coating. The nozzle diameter defines the thickness of the catalyst coat. After a short drying section through ceramic heating elements, for example, the coated braid runs through an annular die via which the ion-conducting membrane is applied in the form of a polymer solution. This step is followed by a longer drying section for expelling the solvent. Thereafter, a second catalyst layer is applied by an applicator nozzle. The outer electrode is then braided around the still pasty catalyst layer. The pasty consistency of the catalyst layer permits penetration of the braid strands and thus permits an intimate connection between catalyst and electrode. If this tubular composite structure composed at least partially of a planar threaded braid is exposed to high pressures from liquids, it is not possible to rule out the possibility of the longitudinal and transverse tensile stresses in the braid causing the threads of the composite structure to shift relative to one another. That shifting can result in undesired stretching effects, particularly in the production of the braid before the actual coating with the membrane material. The consequence of the stretching effects is that the known tubular membrane adopts a shape, and in particular changes in diameter, such that it may be unsuitable for its subsequent intended purpose.

SUMMARY OF THE INVENTION

An object of the present invention is to provide an improved method for producing tubular membranes in such a way that functionally reliable tubular membranes can be obtained at a high production rate and at low cost and that they do not suffer undesired stretching effects with a change of membrane geometry either during their production or in their subsequent use.

This object is basically achieved by a method where a tubular body is constructed from a plurality of threads in such a way that at least some of the threads are tied substantially firmly together along fillet-like connecting lines. Between the fillet-like connecting lines, at least some of the threads form the transverse connection between the mutually adjacent connecting lines. A predefinable membrane material is applied to the tubular body.

A very cost-effective production method is obtained achieving very high output rates for tubular membranes. With the method according to the present invention, it is possible, before application of the membrane material, to obtain tubular bodies in the manner of a conductive knit or circular conductive knit. The conductive knit pattern means that any longitudinal tensile stresses that arise can be safely taken up by continuous longitudinal threads along the fillet-like connecting lines. The looping at the intersections of the conductive knit pattern, that is at the places where the connecting lines and the transverse connections are tied substantially firmly together, avoids shifting of the thread systems relative to one another. The adverse stretching effect during coating is minimized, so that the fabric-reinforced filtration capillary withstands very high internal pressures and mechanically applied longitudinal tensile forces.

In contrast to the braided tubular bodies in which the braid paths can shift relative to one another under corresponding stresses or loads, the looping at the places where the connecting lines and transverse connections are substantially firmly tied together means that shifting cannot take place. The result is that any longitudinal or transverse movements of the thread system are determined solely by the inherent elasticity of the thread material that is used. To this extent, the use of the method according to the present invention results in tubular structures having great dimensional stability and being stable to pressure, both during production of the membrane tubes and during the subsequent use thereof in the ultrafiltration or nanofiltration range of fluids of all types, including in the area of treatment of water and beverages.

In a particularly preferred embodiment of the method according to the present invention, the tubular body designed as a conductive knit is created by a crocheting device. Each inserted thread is assigned its own hooked needle or crochet needle. Crocheting by nature is a needlework technique in which, with the aid of the hooked needle or crochet needle, the thread is formed into loops "in the air", that is, without a support. The interlocking loops can be joined together to form patterns. With the crocheting device, it is possible to introduce supporting or retaining threads continuously along the fillet-like connecting lines, thereby to create a kind of base framework, and then to insert the further threads for the looping at the intersections along the connecting lines and produce the transverse thread arrangement between the connecting lines.

The tubular body is preferably created by crocheting in such a way that passages allowing liquid to pass through at a high flow rate are formed between the individual transverse connections. The fillet-like connecting lines are designed to be substantially liquid-tight or to allow liquid to flow through at a low flow rate. In a particularly preferred embodiment of the method according to the present invention, the threads (monofilaments or multifilaments) are chosen from the group of

- synthetic materials such as polyester, polyaramides, other polymers, carbon, Kevlar, etc., or
- metals (wires) such as nickel, platinum, palladium, gold, silver, stainless steel, etc., or
- catalytically active substances such as ruthenium, rhodium, iridium, nickel, etc., or
- other materials such as cellulose acetate, glass fibers, graphite powder, activated charcoal, etc., or
- from mixtures and compounds of the aforementioned groups.

The above list makes clear that within the meaning of the method according to the present invention, the word thread is to be interpreted broadly. In addition to the usual monofilament and multifilament threads, thread also includes other linear elements such as yarns, wires or rod-like components, including ones constructed from powder.

The adjacent transverse connections are arranged between two connecting lines in such a way that between them they enclose an angle of 10 to 70°, preferably of approximately 25° to 45°, particularly preferably of 30°.

In another particularly preferred embodiment of the method according to the present invention, the tubular body is coated with a membrane-activatable substance guided through a precipitation bath. The substance is converted into a microporous membrane layer.

The membrane materials are chosen in particular from the group of synthetic materials such as polyethersulfone (PES), polysulfone (PSU), polyacrylonitrile (PAN) and polyvinylidene fluoride (PVDF).

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a diagrammatic front perspective view, not to scale, of a section of a tubular membrane in a much simplified representation according to an exemplary embodiment of the present invention

DETAILED DESCRIPTION OF THE INVENTION

In the method according to the present invention for the production of tubular membranes, a tubular body 10 is constructed from a plurality of threads 12 in such a way that at least some of the threads 12 are tied substantially firmly together along fillet-like or fillet-shaped connecting lines 14. Between the fillet-like connecting lines 14, at least some of the threads 12 form the transverse connection 16 between the mutually adjacent connecting lines 14. A predefinable membrane material 18 is applied to the tubular body 10. The fillet-like connecting lines 14 in this case form a longitudinal thread system with longitudinal threads parallel to the longitudinal axis which, via the transverse threads 12 of the respective transverse connection 16, forms a kind of conductive knit, in particular a circular conductive knit.

To obtain the conductive knit in question, the tubular body 10 is created using an industrial crocheting device. Each inserted thread is assigned its own hooked needle or crochet needle. Since mechanical crocheting devices of this kind belong to the prior art, the creation of the tubular body 10 by crocheting will not be described in any further detail. In any event, the tubular body 10 is created by the crocheting in such a way that passages 20 allowing liquid to pass through at a high flow rate are formed between the individual transverse connections 16 in the form of the transverse threads 12. The fillet-like connecting lines 14 acting as a longitudinal thread system are designed to be substantially liquid-tight or to allow liquid to flow through at a low flow rate. To make things clearer, the looping of the threads 12 of the transverse connections 16 with the fillet-like connecting lines 14 is shown in FIG. 1 in the form of linking balls 22, while in reality the crocheting method means that the balls 22 are formed by interconnected stitches or knots. The connecting stitches formed along the connecting lines 14 that cross over at both ends, that is to say to the right and left, to the threads 12 of the transverse connections 16, have additional longitudinal threads 12 which additionally increase the stability and the resistance to longitudinal tensioning of the tubular body 10.

The inserted threads 12 for the transverse connections 16 and for tying them to one another along the points 22 in the transition area to the fillet-like connecting lines 14 are multifilament synthetic threads, for example, of polyester or polyaramides, although other polymers can also be used here. To increase the strength, however, the longitudinal threads along the fillet-like connecting lines 14 are made from carbon fiber materials. If, for example, the tubular membrane is to be used as a fuel cell element or the like, it is possible for some of the threads to be made from an electron-conducting material and for others of the threads to be made from an ion-conducting material. Moreover, the thread system with the ion-conducting action can be provided with a catalyst layer, which can additionally be provided with hydrophobing agents and/or proton conductor material. It is also possible for the tubular membrane to be used as a bipolar ion-exchange membrane to obtain lactic acid or the like. The electrical charge potential of the tubular membrane can also be defined by using metals wires as the thread system.

In the present case, the tubular body 10 includes eight connecting lines 14 and eight transverse connection surfaces 16. However, tubular bodies 10 of six connecting lines 14 and six transverse connections 16 have proven particularly advantageous (not shown). The minimum requirement for constructing a tubular body 10 of triangular cross section (not shown) is that it be constructed from three connecting lines 14 and three transverse connections 16.

For the tubular body 10 constructed in this way to be coated now with a membrane-activatable substance, it is guided through a precipitation bath. The substance is converted into a microporous membrane layer. A method of this kind is disclosed, for example, in WO 03/076055 A1, and thus, will not be described in any more detail herein. The known solution according to the WO publication concerns a method for production of fabric-reinforced capillary membranes, particularly for ultrafiltration, in which a fabric tube is in each case coated with a polymer solution and guided through a precipitation bath. The polymer solution is converted into a microporous layer in the precipitation bath. In this way, a membrane that is reinforced by the fabric tube is formed. The fabric tube coated with the polymer solution passes through the precipitation bath from top to bottom, without mechanical contact, and exits through a nozzle at the bottom. Liquid flows out through the nozzle and exerts a tensile force on the capillary membrane leaving the precipitation bath, and thus, stabilizes the course of the coated fabric tube. The coating method is given only as an example. There are many other coating methods that can be used here, including immersion bath methods. The membrane material is chosen from the group of synthetic materials such as polyethersulfone (PES), polysulfone (PSU), polyacrylonitrile (PAN) and polyvinylidene fluoride (PVDF).

The tubular membrane according to the present invention can be produced continuously and therefore inexpensively. That is to say, the tubular body 10 is prepared on a permanent basis by the crocheting method for the subsequent coating method with the membrane material 18. By virtue of the filter material being made in the form of a conductive knit or circular conductive knit by use of the conventional crocheting technique, a filter tube is obtained in which the longitudinal tensile stresses arising during filtration are taken up by the continuous longitudinal threads along the fillet-like connecting lines 14. The stresses at the periphery are taken up safely by the transverse threads 12 of the composite fabric by the planar transverse connections 16. The looping at the intersection points (balls 22) reduces shifting of the threads 12 relative to one another, so that undesired stretching effects both in the longitudinal direction and in the transverse direction of the tubular body 10 during coating with the membrane material are minimized to a large extent. The fabric-reinforced filtration capillary withstands very high internal pressures and longitudinal tensioning during filtration. The thread strength here can be obtained using threads 12 with a diameter of 20 to 200 μm. The thread number along the lines 14 is preferably three to six.

Practical tests have shown that, with comparable dimensioning, and using the selected technical solution in the form of a circular conductive knit, tensile strengths of 100 N/mm$^2$ can be achieved with an elongation at tear of 1 to 5%. In the dynamic pressure test, such tubes easily withstand a bursting pressure of ca. 30 to 60 bar, while a shortening of the tube of only 1% is noted, so as to guarantee that the membrane tube according to the present invention, designed as a circular conductive knit, is securely retained in a holding device, in particular in the form of at least one module (not shown) of a complete filtration installation.

While one embodiment has been chosen to illustrate the invention, it will be understood by those skilled in the art that various changes and modifications can be made therein without departing from the scope of the invention as defined in the appended claims.

What is claimed is:

1. A method for producing membranes, comprising the steps of:
   constructing a tubular body having a longitudinal axis from a plurality of threads such that some of the threads are tied substantially firmly together along fillet-shaped connecting lines with continuous longitudinal threads parallel to the longitudinal axis;
   between the fillet-shaped connecting lines, forming at least some of the threads as planar transverse connections between mutually adjacent ones of the fillet-shaped connecting lines; and
   applying a predefinable membrane material to the tubular body.

2. A method according to claim 1 wherein
the tubular body is constructed by a crocheting device, with each inserted thread being assigned a separate and respective hooked needle or crochet needle.

3. A method according to claim 2 wherein
the tubular body is constructed by crocheting with passages being formed between individual ones of the transverse connections for allowing liquid to pass through at high flow rates; and
the fillet-shaped connecting lines are formed liquid tight or formed to allow liquid to pass only at a low flow rate.

4. A method according to claim 1 wherein
the threads are monofilaments or multifilaments of synthetic materials selected from the group consisting of polyester, polyaramide, other polymers, carbon and Kevlar.

5. A method according to claim 1 wherein
the threads are monofilaments or multifilaments of metal selected from the group consisting of nickel, platinum, palladium, gold, silver and stainless steel.

6. A method according to claim 1 wherein
the threads are monofilaments or multifilaments of catalytically active substances selected from the group consisting of ruthenium, rhodium, iridium and nickel.

7. A method according to claim 1 wherein
the threads are monofilaments or multifilaments of materials selected from the group consisting of glass fibers, graphite powder and activated charcoal.

8. A method according to claim 1 wherein
adjacent transverse connections are arranged between two connecting lines enclosing an angle therebetween of 10° to 70°.

9. A method according to claim 8 wherein
the angle is approximately 30°.

10. A method according to claim 1 wherein
the tubular body is constructed with at least three connecting lines and with at least three surfaces of transverse connections on which the membrane material is applied.

11. A method according to claim 1 wherein
the tubular body is constructed with at least six connecting lines and with at least six surfaces of transverse connections on which the membrane material is applied.

12. A method according to claim 1 wherein
the tubular body is coated with a membrane-activated substance by being guided through a precipitation bath, with the membrane-activatable substance being converted into a microporous membrane layer.

13. A method according to claim 1 wherein
the membrane material is a synthetic material selected from the group consisting of polyethersulfone, polysulfaone, polyacrylonitrile and polyvinylidene fluoride.

14. A tubular membrane, comprising:
a tubular body having a longitudinal axis construction from a plurality of threads with some of the threads being tied substantially firmly together along fillet-shaped connecting lines having continuous longitudinal threads parallel to the longitudinal axis and with some of the threads forming planar transverse connections extending between mutually adjacent connecting lines; and a predefinable membrane material applied on the tubular body.

15. A tubular membrane according to claim 14 wherein passages extend between individual ones of the transverse connections for allowing liquid to pass through at high flow rates; and the fillet-shaped connecting lines are liquid tight or allow to pass only at low flow rates.

16. A tubular membrane according to claim 14 wherein the threads are monofilaments or multifilaments of synthetic materials selected from the group consisting of polyester, polyaramide, other polymers, carbon and Kevlar.

17. A tubular membrane according to claim 14 wherein the threads are monofilaments or multifilaments of metal selected from the group consisting of nickel, platinum, palladium, gold, silver and stainless steel.

18. A tubular membrane according to claim 14 wherein the threads are monofilaments or multifilaments of catalytically active substances selected from the group consisting of ruthenium, rhodium, iridium and nickel.

19. A tubular membrane according to claim 14 wherein the threads are monofilaments or multifilaments of materials selected from the group consisting of cellulose acetate, glass fibers, graphite powder and activated charcoal.

20. A tubular membrane according to claim 14 wherein adjacent transverse connections are arranged between two connecting lines enclosing an angle therebetween of 10° to 70°.

21. A tubular membrane according to claim 20 wherein the angle is approximately 30°.

22. A tubular membrane according to claim 16 wherein the tubular body is constructed with at least three connecting lines and with at least three surfaces of transverse connections on which the membrane material is applied.

23. A tubular membrane according to claim 16 wherein the tubular body is constructed with at least six connecting lines and with at least six surfaces of transverse connections on which the membrane material is applied.

24. A tubular membrane according to claim 16 wherein the membrane material is a synthetic material selected from the group consisting of polyethersulfone, polysulfaone, polyacrylonitrite and polyvinylidene fluoride.

* * * * *